United States Patent [19]

Edwards et al.

[11] Patent Number: 4,811,561

[45] Date of Patent: Mar. 14, 1989

[54] POWER TRANSMISSION

[75] Inventors: Thomas L. Edwards, Almont; Yehia M. El-Ibiary, Troy; Rajamouli Gunda, Rochester; Richard S. Leemhuis, Rochester Hills; Fred H. Phillips, Troy; Melvin A. Rode, West Bloomfield, all of Mich.

[73] Assignee: Vickers, Incorporated, Troy, Mich.

[21] Appl. No.: 164,958

[22] Filed: Mar. 7, 1988

Related U.S. Application Data

[63] Continuation-in-part of Ser. No. 849,542, Apr. 8, 1986, Pat. No. 4,744,218.

[51] Int. Cl.$^4$ ............................................. F16D 31/00
[52] U.S. Cl. ....................................... 60/368; 60/420; 340/825.06
[58] Field of Search .................... 60/368, 420; 165/22; 236/51; 364/505, 513; 91/424, 427; 340/825.06, 825.52, 825.08

[56] References Cited

U.S. PATENT DOCUMENTS 4,091,361 5/1978 Eichelberger et al. .... 340/825.52 X
4,212,078 7/1980 Games et al. ..................... 165/22 X
4,454,509 6/1984 Buennagel et al. ........ 340/825.06 X Primary Examiner—William E. Wayner
Attorney, Agent, or Firm—Barnes, Kisselle, Raisch, choate, Whittemore & Hulbert

[57] ABSTRACT

An electrohydraulic system includes a plurality of electrohydraulic devices individually controlled by microprocessor-based control electronics. The device controllers are connected in common by a bidirectional serial data bus to a master controller for coordinating operation of the various devices. Internal programming within the master controller establishes a repetitive time-sequence of windows for communications with the various device controllers for downloading control signals and parameters, and for uploading data indicative of system status and operation. The various device controllers include internal programming for operating the associated hydraulic devices as a function of control signals and parameters received from the master controller. Pseudo-devices are also connected to the bus for time-division multiplexed communication with the master controller and for performing overall system coordination and analysis.

10 Claims, 10 Drawing Sheets

MASTER CONTROLLER OPERATION SEQUENCE

- (A) WINDOW FOR BIDIRECTIONAL COMMUNICATION
- (B) DEVICE CONTROL
- (C) WAIT
- (D) DIAGNOSTIC ANALYSIS
- (E) AUTOMATION CALCULATIONS

SYSTEM TIMING

POWER TRANSMISSION

This application is a continuation-in-part of application Ser. No. 849,542 filed Apr. 8, 1986, now U.S. Pat. No. 4,744,218.

The present invention is directed to electrohydraulic servo systems of the type which include a plurality of electrohydraulic devices coupled to a remote master controller.

BACKGROUND AND OBJECTS OF THE INVENTION

In electrohydraulic systems which include a plurality of electrohydraulic devices, such as servo actuators, motors and pumps, it is conventional practice to couple all of such devices to a remote master controller for coordinating device operation to perform desired tasks. Motors and actuators may be employed, for example, at several coordinated stages of a machine tool line for automated transfer and machining of parts at a series of work stations. In another typical application, the moving components of an earth excavator may be coupled to electrohydraulic actuators controlled by a master controller responsive to operator lever or joystick inputs. In accordance with conventional practice, the master controller is coupled through individual digital-to-analog converters to the various remotely-positioned electrohydraulic devices for supplying control signals thereto. For closed-loop operation, a sensor is positioned at each electrohydraulic device for sensing operation thereof, and feeds a corresponding sensor signal to the remote master controller through an analog-to-digital converter or appropriate signal conditioner.

Thus, in a system which embodies a plurality of electrohydraulic devices, a substantial quantity of electrical conductors must be provided for feeding individual control signals to the various devices and returning sensor signals to the master controller. Such conductors interfere with system design and operation, and are subject to failure, add to the expense and complexity of the overall system. Moreover, the master controller must not only coordinate operation among the various electrohydraulic devices and generate corresponding device control signals, but also perform automation and diagnostic calculations, all of which contribute to overall low response time of control systems heretofore proposed.

It is therefore a general object of the present invention to provide an electrohydraulic servo system which exhibits reduced cost and complexity as well as increased responsiveness and flexibility as compared with prior art systems of the character described. In furtherance of the foregoing, a more specific object of the invention is to provide a system of the described character wherein each of the system electrohydraulic devices is controlled by a dedicated local microprocessor-based controller adapted to communicate with a central or master controller over a common data bus for thereby distributing control of the several electrohydraulic devices and reducing interconnection cost and complexity while maintaining overall system coordination.

SUMMARY OF THE INVENTION

In accordance with the present invention, an electrohydraulic servo control system which includes a plurality of electrohydraulic devices coupled to a remote master controller is characterized in that such interconnection is accomplished by a bus common to all of the master and device controllers, and in that all of the device controllers are constructed for connection to the common bus for individual communication with the master controller. In the preferred embodiments of the invention, each of the device controllers includes microprocessor-based control electronics with facility for setting a communication address unique from addresses of all other device controllers connected to the communication bus, such that the master controller may communicate individually with each device controller as a function of associated device addresses.

Most preferably, the interconnection bus comprises a bidirectional serial data bus which connects input ports of the various device controllers in common to an output port of the master controller, and which connects output ports of the various device controllers in common to an input port of the master controller. A power supply applies electrical power to conductors of the common bus, and each of the remote device controllers receives electrical power exclusively from the data bus, such that a system power failure automatically removes power from all device controllers and returns the various controlled electrohydraulic devices to their neutral positions.

The master controller includes facility for establishing a repetitive time sequence of communication windows and for communicating with each of the device controllers in turn during an associated window. During such bidirectional communication, command signals for control of individual devices, as well as other control parameters, may be downloaded to the device controllers, and status information indicative of device condition may be uploaded to the master controller for coordinating operation with the other devices and/or display to an operator. Where one of the electrohydraulic devices comprises a hydraulic pump, the master controller includes facility for establishing a speed limit at the pump, either automatically or by operator selection, and transmitting a signal indicative of such speed limit to the pump controller during the associated pump communication window. The pump controller includes microprocessor-based circuitry coupled to the pump and responsive to speed limit signals from the master controller for limiting operation at the pump to the corresponding speed limit.

One or more pseudo-device controllers are also connected to the communications bus for performing operations common to a multiplicity of the electrohydraulic devices. For purposes of the present application, a "pseudo-device" is defined as a module which connects to the communications bus and is controlled by the master controller for performing operations which do not involve hydraulic motions per se and which affect or bear upon operation of a number of the motion-producing devices. Two examples of pseudo-devices in accordance with the invention are all-electronic modules which perform diagnostic and automation calculations for the master controller, but are treated as separate "devices" by the master controller in terms of control and communication. Coordinating information derived by the pseudo-device controller is reported to the master controller for appropriate use. Another example of a pseudo-device is a series of valves for controlling flow of hydraulic fluid among the various electrohydraulic devices, and an associated microprocessor-based valve flow controller.

BRIEF DESCRIPTION OF THE DRAWINGS

The invention, together with additional objects, features and advantages thereof, will be best understood from the following description, the appended claims and the accompanying drawings in which:

DETAILED DESCRIPTION OF PREFERRED EMBODIMENTS

Figure 1:
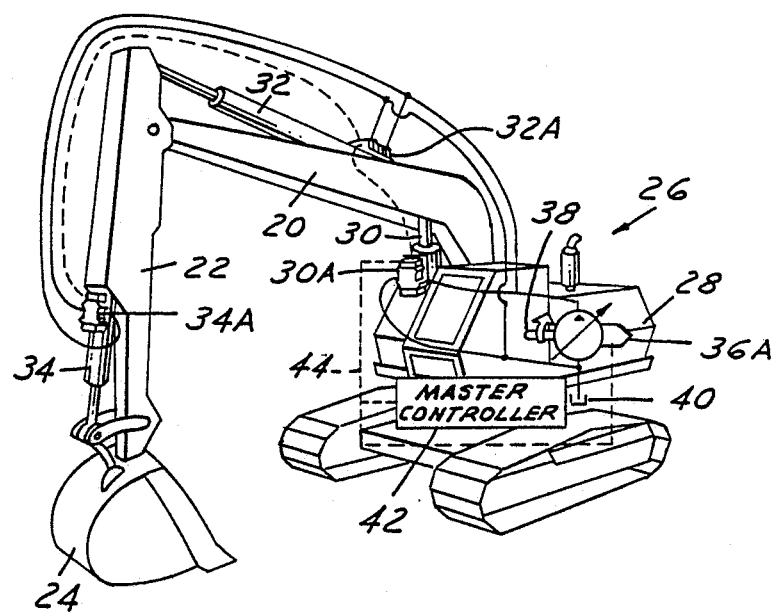
FIG. 1 is a schematic perspective view of an earth excavator having a boom, an arm, a bucket and a pump electrohydraulically controlled in accordance with the principles of the present invention.

The electrohydraulic control system of the present invention will be described in detail in conjunction with an exemplary application thereof for individually controlling motion of the boom 20, arm 22 and bucket 24 of an earth excavator 26 (FIG. 1) of generally conventional mechanical construction. The position of boom 20 with respect to the body 28 of excavator 26 is controlled by a linear hydraulic actuator 30. Likewise, the position of arm 22 with respect to boom 20 is controlled by the linear actuator 32, and the pivotal position of bucket 24 on the end of arm 22 is controlled by the linear actuator 34. Each of the actuators 30, 32, 34 has associated therewith an electrohydraulic servo assembly 30A, 32A, 34A. A variable displacement hydraulic pump 36 has an input shaft 38 coupled to the engine (not shown) of excavator 26. Pump 36 has an input connected to a fluid sump 40 and an output for supplying fluid under pressure to servo assemblies 30A, 32A and 34A. A master controller 42 is connected by a serial data bus 44 to a servo assembly 36A associated with pump 36, and to servo assemblies 30A, 32A and 34A associated with actuators 30, 32 and 34. In practice, a typical excavator 26 would additionally embody hydraulically controlled swing of body 28 and propulsion of the left and right tracks. These motion variables may also be controlled in accordance with the present invention.

Figure 3:
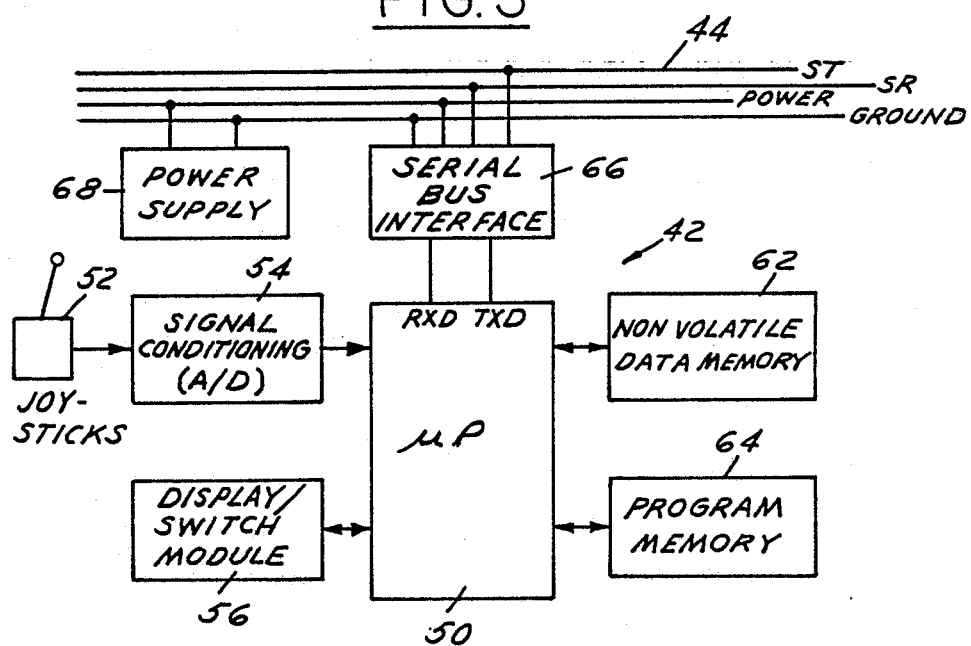
FIG. 3 is a more detailed functional block diagram of the master controller illustrated in FIG. 2.
Figure 2:
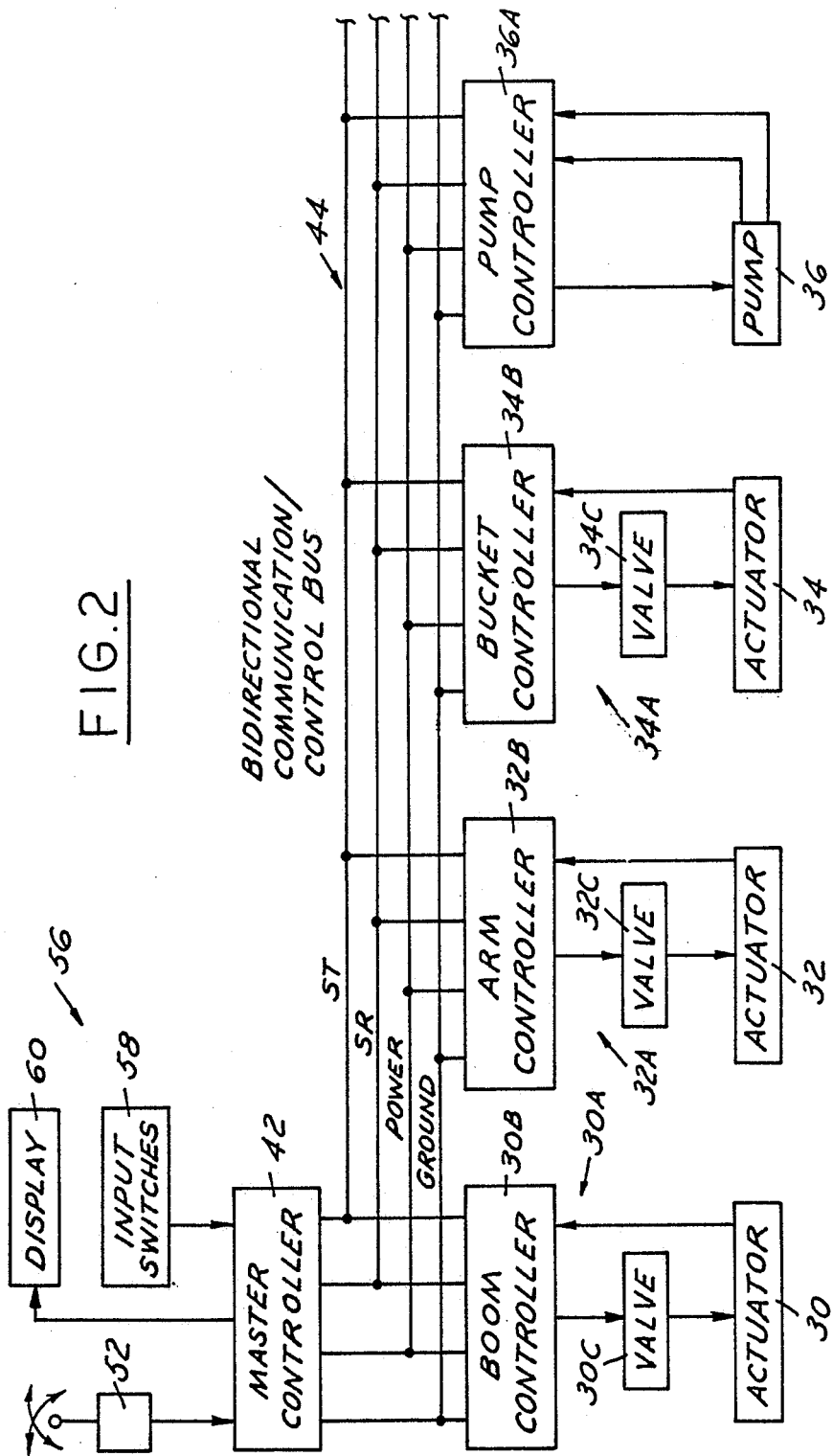
FIG. 2 is a functional block diagram of the electrohydraulic control system embodied in the excavator of FIG. 1.

Referring to FIGS. 2 and 3, master controller 42 includes a microprocessor 50 which receives operator inputs from a joystick or the like 52 through an a/d converter or other suitable signal conditioning circuitry 54. Microprocessor 50 also communicates with a display/switch module 56 which includes switches 58 for selective input or modification of system parameters by the operator, and a display 60 for indicating system status and operation to the operator. Microprocessor 50 is also interconnected with a nonvolatile data memory 62 for storing parameters required by the controlled devices, and to a memory 64 for storing system operating programs. Microprocessor 50 has an input port RXD and an output port TXD respectively connected through a serial interface 66 to a pair of conductors SR and ST of data bus 44. A power supply 68, which may comprise a battery supply or a generator supply powered by the engine of excavator 26, applies electrical power to a pair of bus conductors POWER and GROUND. Master controller 42 receives electrical power from such bus conductors.

Figure 4:
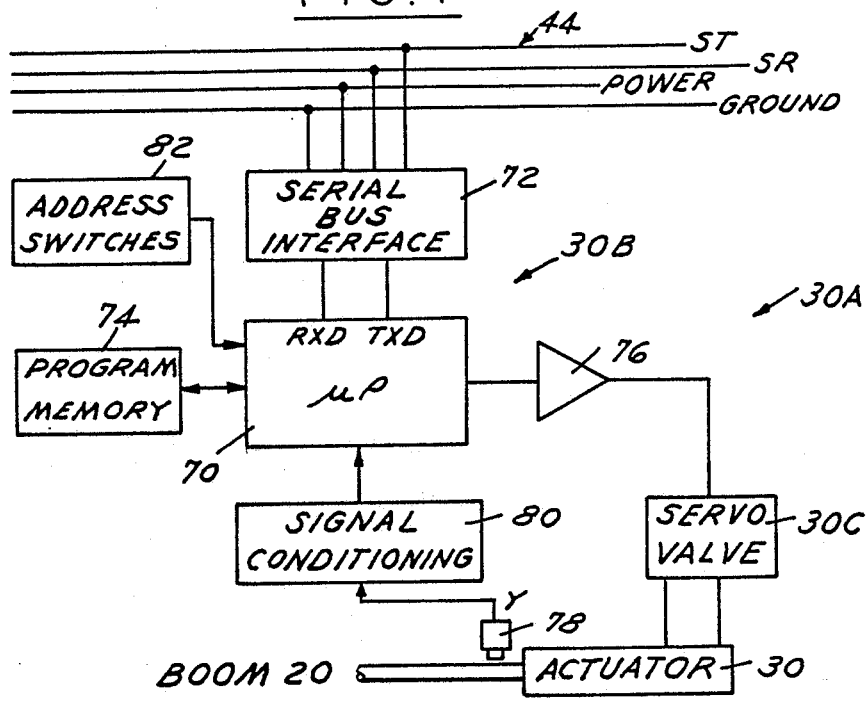
FIG. 4 is a more detailed functional block diagram of the boom controller illustrated in FIG. 2.

Each of the boom, arm and bucket servo assemblies 30A, 32A and 34A includes an associated electronic controller 30B, 32B and 34B (FIG. 2) coupled through a servo valve 30C, 32C and 34C to the associated linear actuator 30, 32 and 34. Boom controller 30B (FIGS. 2 and 4) includes a microprocessor 70 having an input port RXD and an output port TXD respectively coupled through a serial interface 72 to the ST and SR conductors of bus 44. Boom controller 30B also receives electrical power from the POWER and GROUND conductors of bus 44 through serial. Microprocessor 70 is coupled to a memory module 74 having stored therein one or more programs for controlling operation of actuator 30. Exemplary control programs will be discussed in connection with FIGS. 8 and 9, and are selectable by the master controller. Microprocessor 70 is connected through a power amplifier 76 to provide pulse width modulated signals to servo valve 30C for controlling operation of actuator 30. A position transducer 78 is responsive to motion at actuator 30 for providing a position signal Y to microprocessor 70 through signal conditioning circuitry 80. Address selection switches 82 or the like are connected to microprocessor 70 for operator preselection of a communication address to be associated with boom controller 30B. A suitable servo valve assembly, which would include boom controller 30B and servo valve 30C in a single unit, is disclosed in copending application (V-3985) filed concurrently herewith and assigned to the assignee hereof. Arm controller 32B and bucket controller 34B are structurally identical to boom controller 30B hereinabove described in detail.

Figure 5:
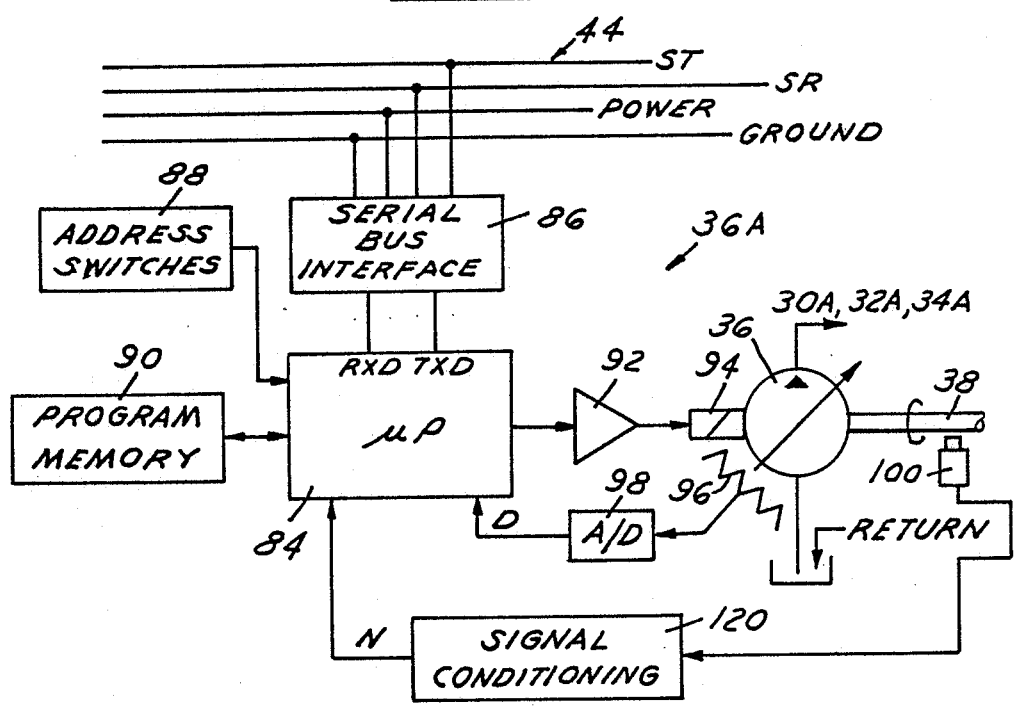
FIG. 5 is a more detailed functional block diagram of the pump controller illustrated in FIG. 2.

Pump controller 36A (FIG. 2) is illustrated in FIG. 5 as comprising a microprocessor 84 having an input port RXD and an output port TXD respectively connected to the ST and SR conductors of bus 44 through a serial interface 86. Thus, the input ports RXD of the boom, arm, bucket and pump controller microprocessors are connected in common (through serial interfaces) by the ST conductor of bus 44 to output port TXD of master controller microprocessor 50 (FIG. 3). Likewise, the output ports TXD of the boom, arm, bucket and pump controller microprocessors are connected in common (through serial interfaces) by the SR conductor of bus 44 to input port RXD of master controller microprocessor 50. Pump controller microprocessor 84 receives a communication address input from associated address switches 88, and is connected to a memory 90 having stored thereon the various pump control programs. One such program, selectable by the master controller, will be discussed by way of example in connection with FIG. 10. A power amplifier 92 feeds pulse width modulated control signals from microprocessor 84 to the control solenoid 94 of pump 36 for controlling yoke position, and thereby controlling the output of pump 36. A transducer 96 is connected through an a/d converter 98 for providing a signal D to microprocessor 84 indicative of yoke position. Likewise, a sensor 100 is operatively coupled to pump input shaft 38 to provide a signal N through conditioning circuitry 102 indicative of pump shaft speed.

Figure 6:
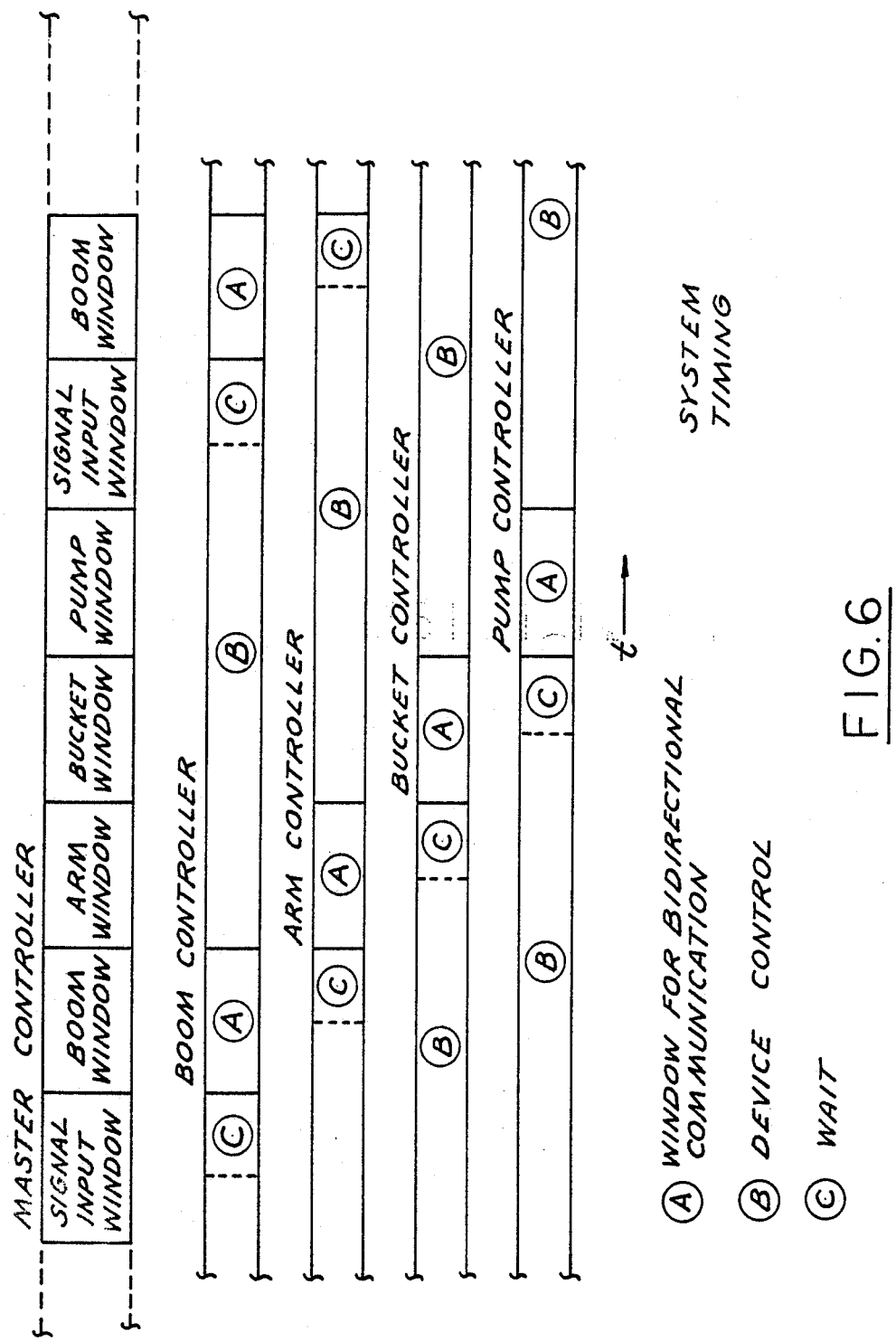
FIG. 6 is diagram which illustrates communication timing between the master controller and the various device controllers in accordance with a preferred embodiment of the present invention.
Figure 7:
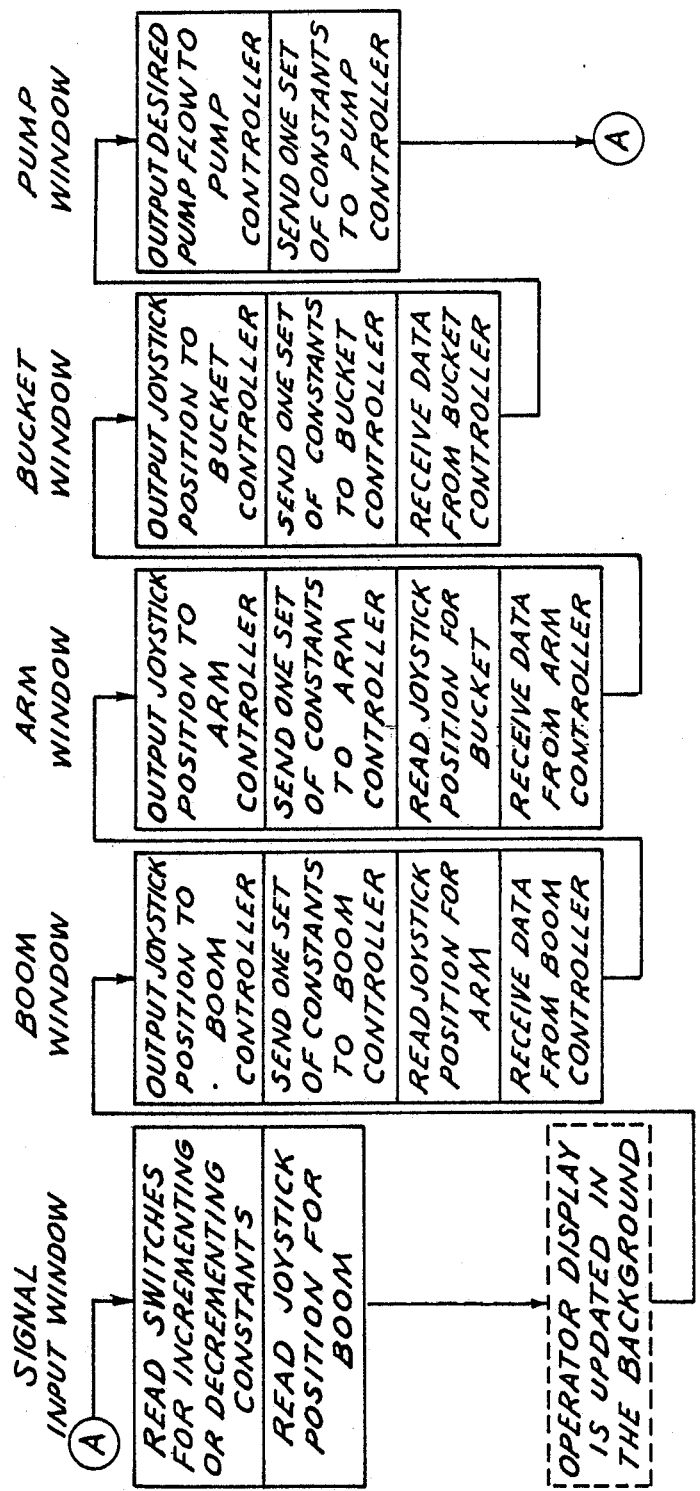
FIG. 7 is a flow chart which illustrates sequence of operations at the master controller.

FIGS. 6 and 7 illustrate sequence of operations and communications between the master controller and the device controllers. Referring to FIG. 6, programming within master controller microprocessor 50 and associated program memory 64 (FIG. 3) establishes a repetitive time-sequence of communication windows—i.e., a signal input window, a boom communications window, an arm communications window, a bucket communications window and a pump communications window—with the same sequence being repeated indefinitely. During the signal input window (FIGS. 6 and 7) master controller microprocessor 50 first reads operator switches 58 (FIG. 2) for incrementing or decrementing control parameters at the various device controllers, and then reads the operated boom-joystick position. The operator display is continuously updated in programming background. At commencement of the boom communications window, the master controller first transmits the boom controller address to establish communications with boom controller microprocessor 70 (FIG. 4), and then sequentially outputs or downloads boom joystick position and one set of parameter constants. Boom joystick position and updated constant are stored in memory at boom controller 30B for later use for control purposes. Meanwhile, the master controller microprocessor reads and stores operator joystick position for the excavator arm, and is then prepared to receive data uploaded from the boom controller indicative of controller status and to store such data in non-volatile data memory 62 (FIG. 3). As shown in FIG. 7, a similar communication sequence takes place during each of the arm, bucket and pump communication windows. During the pump communications window, the master controller downloads a control signal indicative of pump output.

FIG. 7 also illustrates timing at each of the boom, arm, bucket and pump controllers relative to the sequence of master controller communication windows. Each of the device controllers is dedicated to communication with the master controller during the time of the corresponding communications window. Following such communications, each controller has an opportunity to implement motion control at its associated device while the master controller is communicating in turn with the other device controllers. However, device motion control must be completed before onset of the next communications window associated with a given controller. Toward this end, it is preferable that each of the sequential communication windows be of fixed, although not necessarily identical, time duration, so that the total time available for motion control at each device controller is pre-established and constant.

Table 1 at the end of the specification illustrates communications protocol between the master controller and one device controller during the associated communications window. At the onset of the communications window, a first communication frame consisting of a series of three bytes is transmitted from the master controller to the device controller. The first bit of the first byte consists of a "wakeup" bit set to 1, followed by parity bits for each of the three frame bytes, two unused bits and the three-bit address of the device with which communication is to be established. Such address must, of course, correspond to the device controller address established by switches 82 (FIG. 4) or 88 (FIG. 5). Bytes two and three of the first frame include data bits ("wakeup" bit set to zero) indicative of operator joystick position for the device controller. A second frame likewise includes a sequence of three bytes transmitted from the master to the device controller. The first byte includes parity bits for each byte (no wakeup bit), and the storage address into which subsequent data is to be loaded at the device controller. The second and third bytes of the second communication frame include data bits associated with control constants or parameters to be employed at the device controller. Additional frames can be transmitted similarly if required.

First and second communication frames & Table II each include a sequence of three bytes transmitted from the device controller to the master controller indicative of device operation and status. The first byte of the third frame includes a wakeup bit, three parity bits and the address into which subsequent data is to be stored at the master controller. The second and third bytes of the third frame include such data. The first byte of the fourth frame again includes parity bits and data address bits, with the second and third bytes including associated data. Exemplary software in Intel assembly code for use in conjunction with Intel 8031 or 8051 microprocessor packages to implement the foregoing communication scheme accompanies this specification as Appendix A (communications window timing at the master controller), Appendix B (serial communications at the master controller) and Appendix C (serial communications at the device controller).

Figure 8:
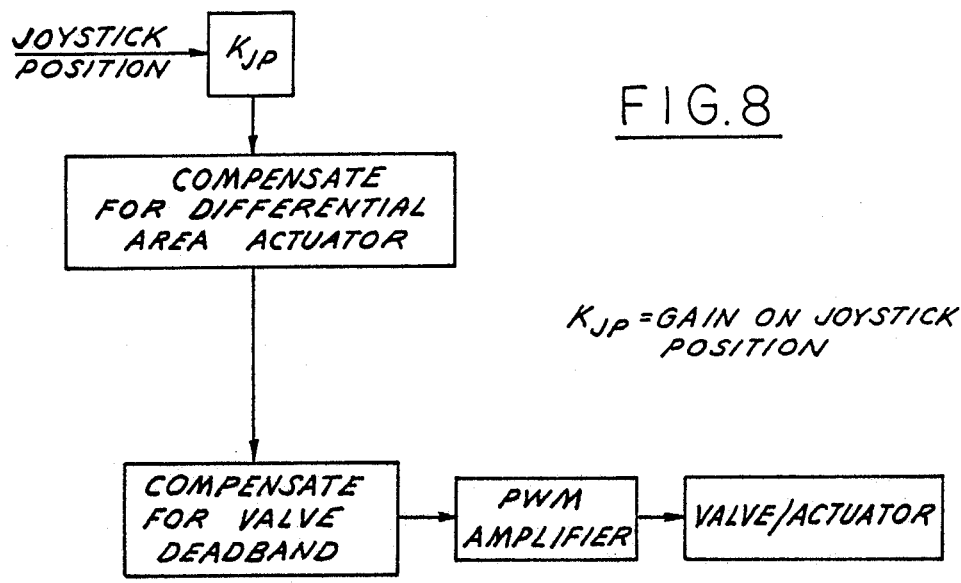
FIG. 8 is a flow chart which illustrates operation of the boom controller in an open-loop mode.
Figure 9:
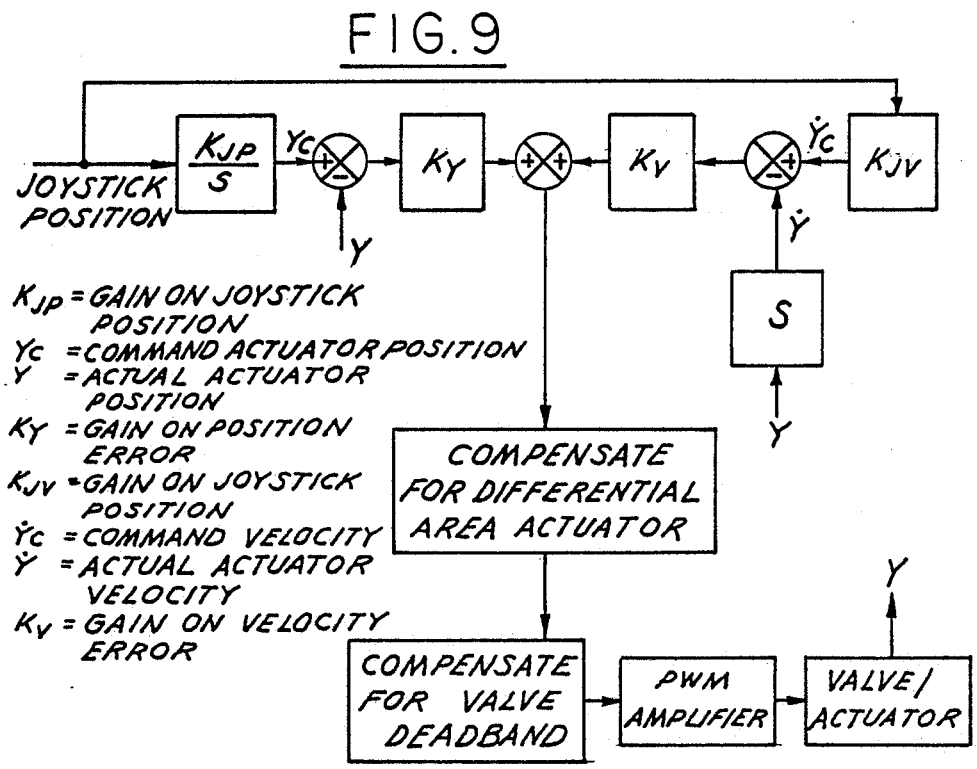
FIG. 9 is a flow chart which illustrates operation of the boom controller in a closed-loop mode.

FIG. 8 is a flow diagram which illustrates operation of boom controller 30B (FIG. 2, or arm controller 32B or bucket controller 34B) in an open-loop mode, and FIG. 9 illustrates operation in a closed loop mode, mode of operation being selectable by the operator and controlled by transmission of data during the second communications frame (Table I), for example. In the open-loop mode (FIG. 8), joystick position previously transmitted and stored in the device controller microprocessor, and indication of desired velocity at the load, is first multiplied by a constant Kjp (which can be varied by the operator via master controller). The control signal is then subjected to compensation for differential area on opposing sides of the actuator piston, and for any deadband in valve operation. A pulse width modulated signal is then transmitted by a power amplifier (76 in FIG. 4) to the servo valve and actuator (30C and 30 in FIG. 4) for obtaining desired motion at the load—i.e. at boom 20 (FIG. 1).

During the closed-loop mode of operation (FIG. 9), the joystick position signal indicative of desired velocity at the boom is first multiplied by constant Kjp and integrated to obtain a corresponding position command signal Yc. The position command signal is compared with the signal Y indicative of actual position at the actuator and load, and the resulting error signal is multiplied by a second constant Ky. At the same time, the position signal Y is differentiated to obtain a signal Y indicative of velocity at the actuator and load, and compared with a velocity command signal Yc derived from input joystick position. The resulting velocity error signal is multiplied by a constant Kv. The two error signals are summed, subjected to compensation as previously described, and thereafter control duty cycle of the pulse width modulated signal transmitted to the servo valve. It will be appreciated, of course, that the control schemes of FIGS. 8 and 9 are strictly exemplary. Other suitable control schemes are illustrated in the following copended applications, all of which are assigned to the assignee hereof: S/N 684,265 filed Dec. 20, 1984, S/N 709,134 filed Mar. 7, 1985, S/N 740,481 filed June 3, 1985 and S/N 765,796 filed Aug. 15, 1985. Hardware suitable for use at any of the device controllers 30B, 32B, 34B and 36A, together with further exemplary programming is illustrated in U.S. Pat. No. 4,502,109 and in copending application serial No. 699,039 filed Feb. 7, 1985, both of which are assigned to the assignee hereof. As previously noted, mode of operation and all constants may be varied and downloaded by the operator and/or master controller.

Figure 10:
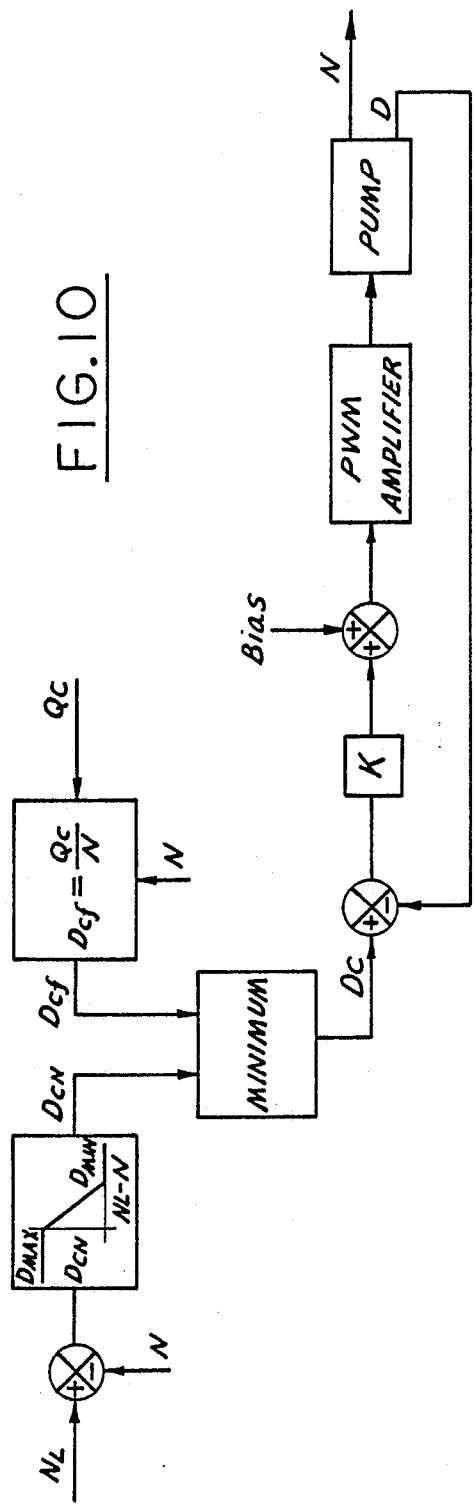
FIG. 10 is a flow chart which illustrates operation of the pump controller in a closed-loop load-limiting mode.

FIG. 10 is a flow chart which illustrates an exemplary scheme for control of pump 36 at pump controller 36A (FIGS. 1, 2 and 5). A flow command signal Qc computed by master based on operator inputs transmitted to the pump controller during the corresponding communications window is divided by actual pump speed N to obtain the displacement Dcf necessary to obtain desired flow Qc. Meanwhile, a speed limit command N1, which is set by the master controller or the operator and downloaded to the pump controller, is compared with actual pump speed N. A lower limit speed command N1 established, for example, to prevent stalling of the pump-drive engine. The resulting difference N1 - N is examined to establish a displacement command Dcn based upon pump speed. The two displacement command signals Dcn and Dcf are examined, and the lesser of the two is selected as a displacement command signal Dc. The latter is compared with actual pump displacement D. The difference or error is multiplied by a constant K, subjected to compensation for bias or offset, and then controls duty cycle of a pulse width modulated signal to pump displacement control solenoid 94 (FIG. 5). It will be appreciated, of course, that the pump control scheme illustrated in FIG. 10 is strictly exemplary.

TABLE I

Master Controller/Device Controller Serial Communication Protocol

| | | | | | | | | | |
|---|---|---|---|---|---|---|---|---|---|
| Frame 1 - Master to Device | | | | | | | | | |
| Byte 1 | 1 | P1 | P2 | P3 | U | U | A | A | A |
| Byte 2 | 0 | D | D | D | D | D | D | D | D |
| Byte 3 | 0 | D | D | D | D | D | D | D | D |
| Frame 2 - Master to Device | | | | | | | | | |
| Byte 1 | 0 | P1 | P2 | P3 | F | F | F | F | F |
| Byte 2 | 0 | D | D | D | D | D | D | D | D |
| Byte 3 | 0 | D | D | D | D | D | D | D | D |
| Frame 3 - Device to Master | | | | | | | | | |
| Byte 1 | 1 | P1 | P2 | P3 | P | P | P | P | P |
| Byte 2 | 0 | D | D | D | D | D | D | D | D |
| Byte 3 | 0 | D | D | D | D | D | D | D | D |
| Frame 4 - Device to Master | | | | | | | | | |
| Byte 1 | 0 | P1 | P2 | P3 | P | P | P | P | P |
| Byte 2 | 0 | D | D | D | D | D | D | D | D |
| Byte 3 | 0 | D | D | D | D | D | D | D | D |

Figure 11:
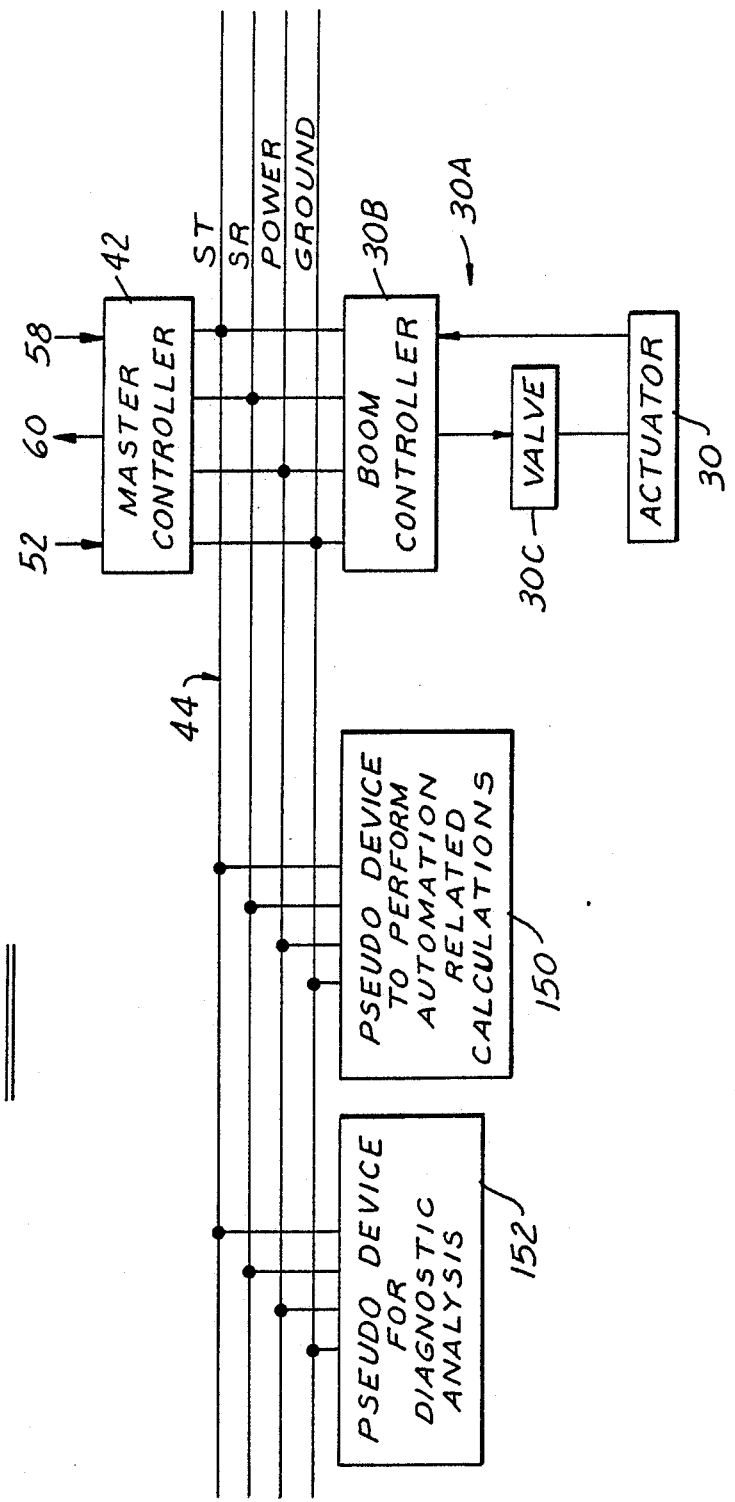
FIG. 11 is a functional block diagram of a modified electrohydraulic control system for implementing automation and diagnostics in the excavator of FIG. 1.
Figure 12:
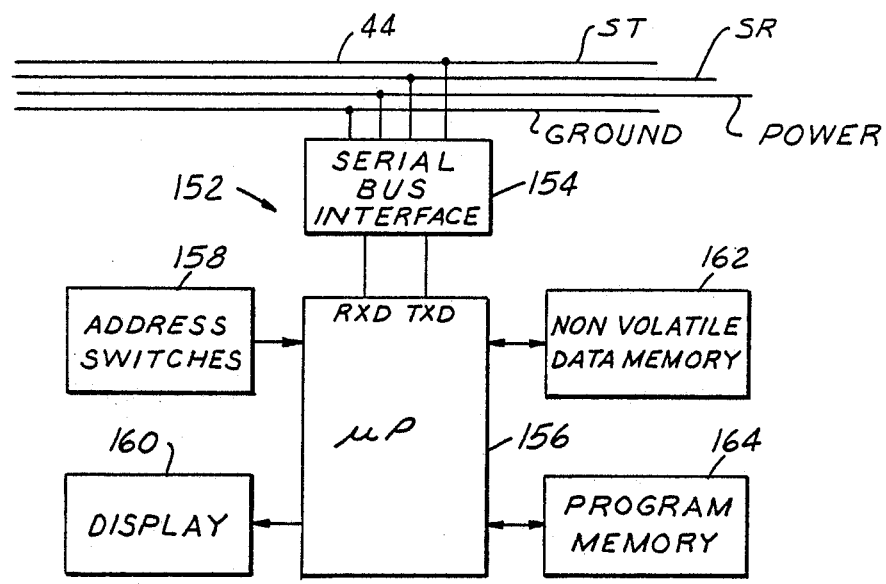
FIG. 12 is a functional block diagram of the automation and diagnostic pseudo-device controllers of FIG. 11.

Where
P1 = parity bit of byte 1
P2 = parity bit of byte 2
P3 = parity bit of byte 3
U = unused
A = device address bit
D = data bit
F = used to define data storage address at device
P = used to define data storage address at master FIG. 11 illustrates a modification to the system of FIG. 2 in which a pair of pseudo-devices 150,152 are connected to bus 44 for individual communication with master controller 42. Pseudo-device 152 is for performing automation-related calculations based upon operating data fed thereto from master controller 42, and for transmitting corresponding automation control information to the master controller. In the case of excavator 26 (FIG. 1), for example, automation may involve many complex trigonometric calculations which would otherwise be performed by master controller 42. Pseudo-device 152 is for performing diagnostic analysis of system operation based upon operating data fed thereto by master controller 42, and for reporting diagnostic information to the master controller for display at 60 (FIG. 2) or 110 (FIG. 12). Again, such diagnostic analysis would otherwise be performed by the master controller. Thus, pseudo-devices 150,152, in effect, relieve the master controller from time-consuming data analysis, and thus effectively free the master controller for enhanced performance of its primary function—i.e., communication with and coordination among device controllers 30B, 32B, 34B, 36A (FIG. 2).

Figure 13:
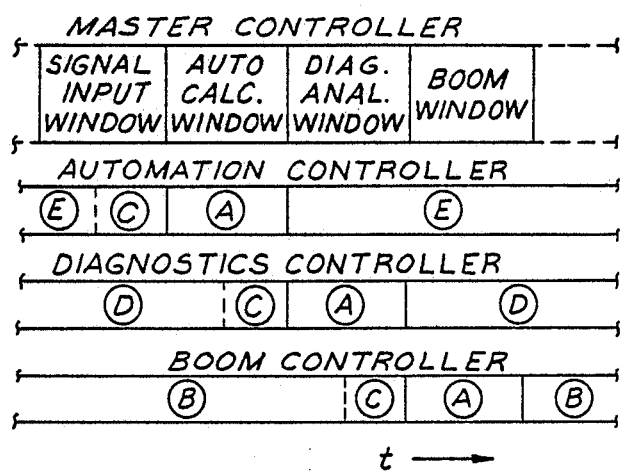
FIG. 13 is a fragmentary communications timing diagram for the system of FIG. 11.

FIG. 12 is a functional block diagram of the electronic controller in pseudo-device 152, device 150 being identical thereto. Bus 44 is connected through a serial interface 154 to a microprocessor 156. Device address is set at switches 158, and operation is indicated at display 160. Non-volatile data memory 162 and program memory 164 are coupled to microprocessor 156. In pseudo-device 150, program memory contains algorithms for performing automatic calculations on data downloaded from master controller 42 and stored in memory 162. In pseudo-device 152, program memory 164 contains suitable algorithms for diagnostically analyzing device and system performance data downloaded from master controller 42 and stored in memory 162. The automation and diagnostic programming per se can be of any suitable types conventionally performed in the master or host controller. FIG. 13 illustrates modification to the sequence of FIGS. 6 and 7 for communication with pseudo-device controllers 150,152. In this connection, it is important to note that pseudo-devices 150,152 are treated by master controller 42 in the same manner as are device controllers 30B, 32B, etc. in terms of data and command communications.

Figure 14:
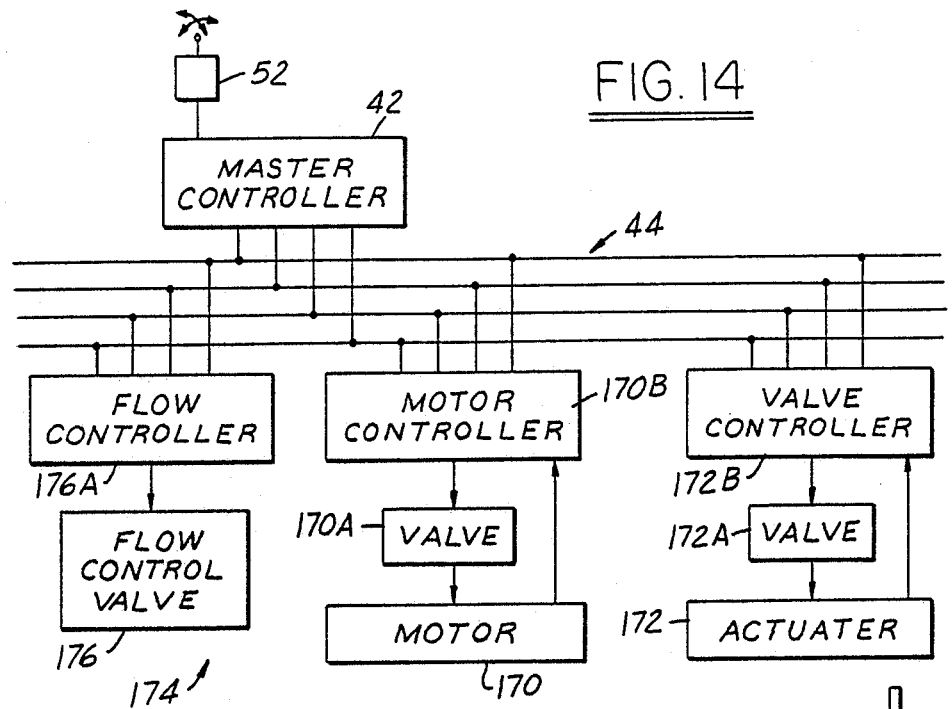
FIG. 14 is a functional block diagram of a control system in accordance with another embodiment of the invention.
Figure 15:
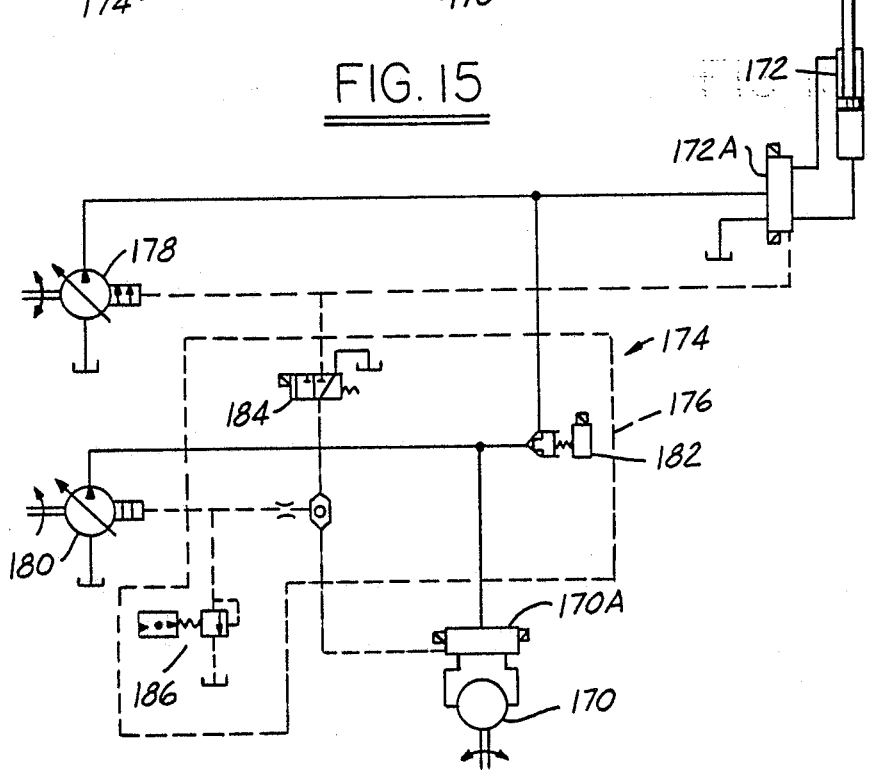
FIG. 15 is a schematic diagram of the hydraulics in the system embodiment of FIG. 14.

FIGS. 14 and 15 illustrate a modification for use in an auger. Rotation of the auger is controlled by an hydraulic motor 170. The auger (and motor) is mounted on a boom arm whose position is controlled by a hydraulic actuator 172. Motor 170 and actuator 172 have associated servo valves 170A, 172A and valve controllers 170B, 172B connected by data bus 44 to master controller 42. A pseudo-device 174 comprises a series of flow control valves 176 controlled by a flow controller 176A which communicates with master controller 42 over bus 44. FIG. 15 is a hydraulic schematic diagram of the system of FIG. 14. A hydromechanical pump 178 supplies hydraulic fluid under pressure to actuator 172 through valve 172A, and load pressure (phantom lines) at the downstream side of valve 172A is fed back to the pump control input. Pump 178 automatically adjusts pump displacement (i.e., flow) such that the pressure drop between the pump discharge and the load sensing input is maintained at a constant load sensing pressure differential. Valve 172A that supplies flow to the load sees the same pressure differential; therefore, flow to the load varies in proportion to valve opening. A pump 180 likewise supplies fluid to motor servo valve 170A and receives a load sensing pressure from valve 170A, both through pseudo-device 174.

Device 174 includes a cartridge valve 182 responsive to controller 176A (FIG. 14) for selectively combining the output flows of pump 178,180. A directional valve 184 is likewise responsive to controller 176A for selectively combining the load sensing pressures. An electronically adjustable pressure relief valve 186 is responsive to controller 176A to selectively adjustably limit load sensing pressure at pump 180. A shuttle valve 188 transmits to pump 180 the higher load sensing pressure from valve 172A, 170A.

In an initial lowering mode of operation, master controller 42 (FIG. 14) commands valve 172A (through controller 172B) to deliver a specified flow to the rod-end of actuator 172. Master controller 42 also commands motor 170 to turn at a low speed. Lastly, it commands pseudo-device 174 to de-energize cartridge valve 182 and directional valve 184, and to set pressure relief valve 186 at 3000 psi, for example. De-energizing the cartridge valve isolates the outputs of the two pumps. The two load sensing pressures are isolated by de-energizing directional valve 184. In a subsequent augering mode, master controller 42 commands valve controller 172B to change to a pressure control mode, and maintain a specified pressure in actuator 172. Master controller 42 also commands a certain auger speed at motor 170 through motor controller 172B and valve 172A. Lastly, it directs pseudo-device controller 176A to de-energize cartridge valve 182, de-energize directional valve 184 and set pressure relief valve 186 at 5000 psi, for example, as needed for augering. In a hoisting mode of operation, master controller 42 commands valve controller 172B to deliver a specified flow to the head-end of actuator 172. It commands motor 170 to turn at a specified speed, and it commands pseudo-device 174 to energize cartridge valve 182 and directional valve 184, and to set pressure relief valve 186 at 3000 psi as needed by the hoisting cylinder. Energizing cartridge valve 182 functions to combine the outputs of the two pumps, and energizing directional valve 184 combines the two load sensing pressures, such that pump 180 sees the higher of the two load sensing pressures. However, the load sensing pressure seen by pump 180 is limited to the relief valve setting of 3000 psi.

The invention claimed is:

1. An electrohydraulic system with distributed control comprising:

a plurality of electrohydraulic devices responsive to electronic control signals for performing hydraulic operations to obtain motion at loads coupled to said devices, control means for providing said control signals and comprising a plurality device control means each associated with and directly controlling motion at an individual said hydraulic device, pseudo-device control means for performing operations common to a multiplicity of said devices, and master control means for coordinating operation among said device and pseudo-device control means, and a communications bus interconnecting said master, device and pseudo-device control means, each of said device and pseudo-device control means being constructed for individual communication with said master control means on said bus, said master control means including means for establishing a repetitive time sequence of communication windows and means for communicating with each of said device and pseudo-device control means in turn during an associated said window, each said device and pseudo-device control means including means for communicating with said master control means only during an associated said window, and means for performing control operations other than during said associated window.

2. The system set forth in claim 1 wherein each window in said repetitive time sequence is of fixed time duration.

3. The system set forth in claim 2 wherein each of said master, device and pseudo-device control means includes separate transmission and reception ports, and wherein said bus includes first means connecting said transmission port at said master control means in common to said reception ports at all of said device and pseudo-device control means, and second means connecting said transmission ports at all of said device and pseudo-device control means in common to said reception port at said master control means.

4. The system set forth in claim 1 wherein said pseudodevice control means comprises means responsive to operating data received from said master control means for obtaining coordinated control information associated with said devices and said device control means, and means for transmitting said coordinated control information to said master control means.

5. The system set forth in claim 4 wherein said pseudo-device control means includes means for diagnosing operation among said devices and reporting malfunction to said master control means.

6. The system set forth in claim 4 wherein said pseudo-device control means includes means for automating operation among said plurality of devices and transmitting corresponding device control information to said master control means.

7. The system set forth in claim 1 wherein said pseudo-device control means includes means for controlling distribution of hydraulic fluid under pressure to said devices.

8. An electrohydraulic system with distributed control comprising:

a plurality of electrohydraulic devices responsive to electronic control signals for performing hydraulic operations to obtain motion at loads coupled to said devices, control means for providing said control signals and comprising a plurality of individual device control means each associated with and directly controlling motion at an individual said hydraulic device, pseudo-device control means for performing operations common to a multiplicity of said devices, and master control means for coordinating operation among said device and pseudo-device control means, and a communications bus interconnecting said master, device a pseudo-device control means, each of said device and pseudo-device control means being constructed for individual communication with said master control means on said bus, said pseudo-device control means comprising means responsive to operating data received from said master control means for diagnosing operation among said devices, and means for reporting malfunction to said master control means.

9. An electrohydraulic system with distributed control comprising:

a plurality of electrohydraulic devices responsive to electronic control signals for performing hydraulic operations to obtain motion at loads coupled to said devices, control means for providing said control signals and comprising a plurality of individual device control means each associated with and directly controlling motion at an individual said hydraulic device, pseudo-device control means for performing operations common to a multiplicity of said devices, and master control means for coordinating operation among said device and pseudo-device control means, and a communications bus interconnecting said master, device and pseudo-device control means, each of said device and pseudo-device control means being constructed for individual communication with said master control means on said bus, said pseudo-device control means comprising means responsive to operating data received from said master control means for automating operation among said plurality of devices, and means for transmitting corresponding device control information to said master control means.

10. An electrohydraulic system with distributed control comprising:

a plurality of electrohydraulic devices responsive to electronic control signals for performing hydraulic operations to obtain motion at loads coupled to said devices, control means for providing said control signals and comprising a plurality of individual device control means each associated with and directly controlling motion at an individual said hydraulic device, pseudo-device control means for performing operations common to a multiplicity of said devices, and master control means for coordinating operation among said device and pseudo-device control means, and a communications bus interconnecting said master, device pseudo-device control means, each of said device and pseudo-device control means being constructed for individual communication with said master control means on said bus, and said pseudo-device control means including means for controlling distribution of hydraulic fluid under pressure to said devices.

* * * * *